Feb. 15, 1966   M. M. GRAHAM ETAL   3,235,180
COMBINATION PRESSURE AND TEMPERATURE CONTROL
Filed Jan. 18, 1963   8 Sheets-Sheet 1

INVENTORS
MARVIN M. GRAHAM
JOHN W. WRIGHT
BY   HENRY C. BRAUCKSIEK

Browne, Schuyler and Beveridge
ATTORNEYS

Feb. 15, 1966    M. M. GRAHAM ETAL    3,235,180
COMBINATION PRESSURE AND TEMPERATURE CONTROL
Filed Jan. 18, 1963    8 Sheets-Sheet 2

INVENTORS
MARVIN M. GRAHAM
JOHN W. WRIGHT
HENRY C. BRAUCKSIEK
BY Browne, Schuyler and Beveridge
ATTORNEYS

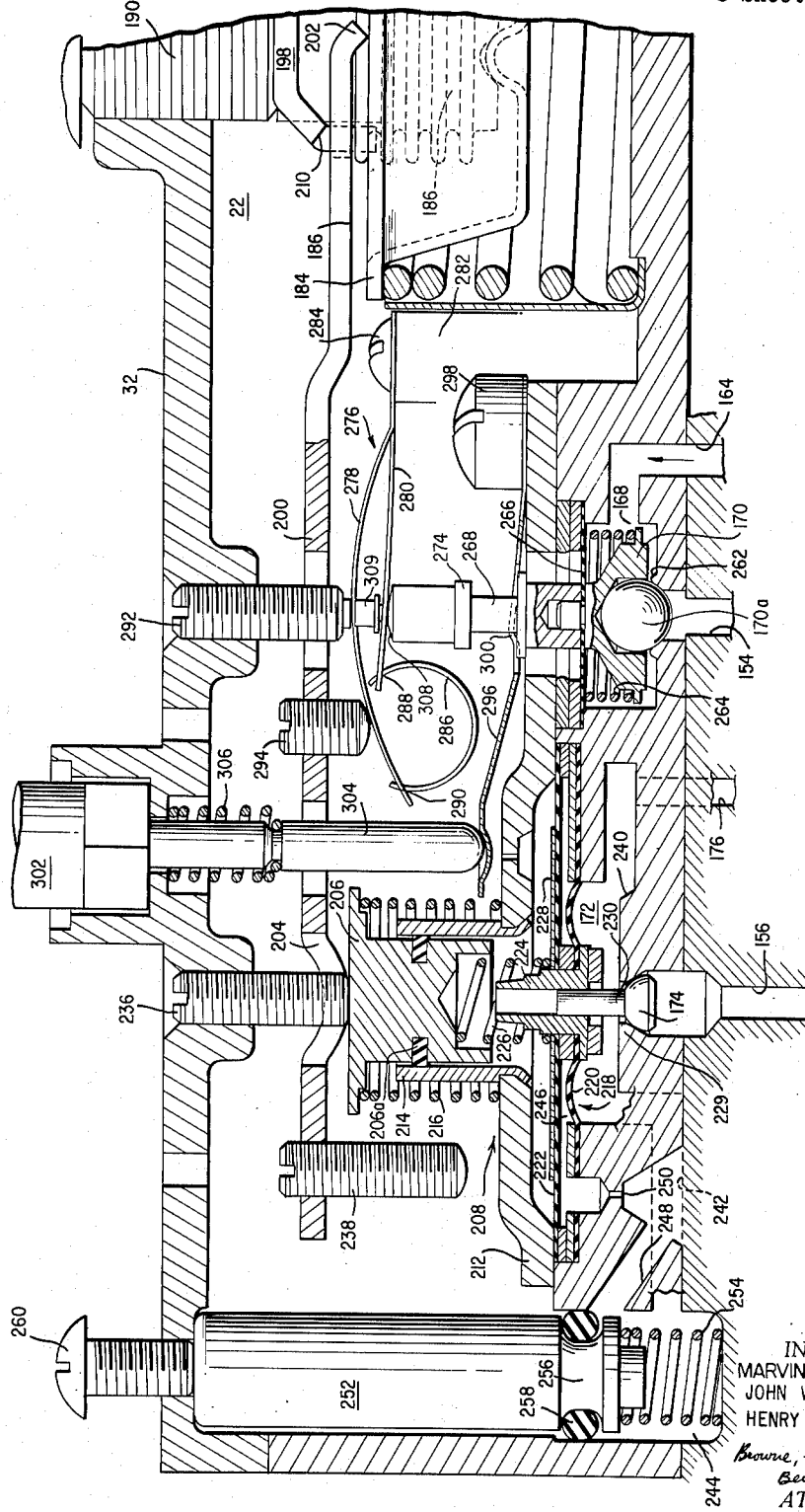

Feb. 15, 1966   M. M. GRAHAM ETAL   3,235,180
COMBINATION PRESSURE AND TEMPERATURE CONTROL
Filed Jan. 18, 1963   8 Sheets-Sheet 4

INVENTORS
MARVIN M. GRAHAM
JOHN W. WRIGHT
HENRY C. BRAUCKSIEK
BY Browne, Schuyler and Beveridge
ATTORNEYS

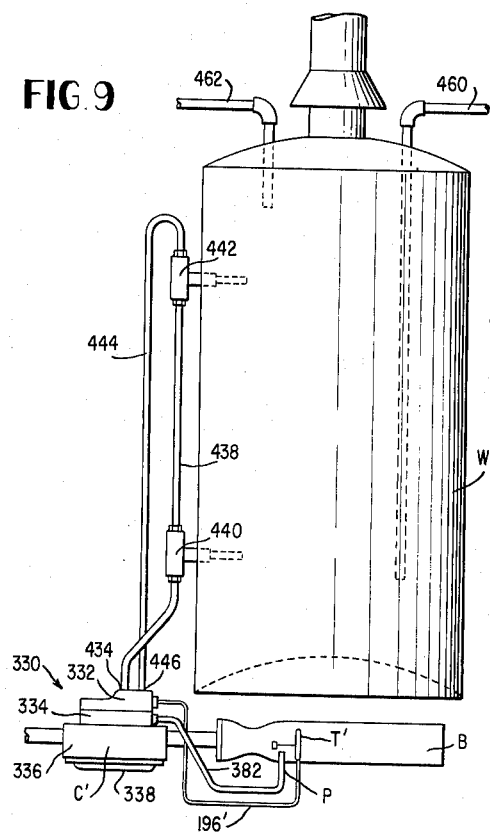
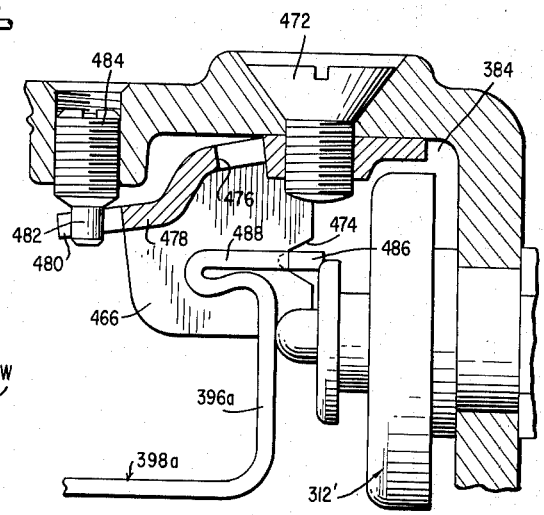
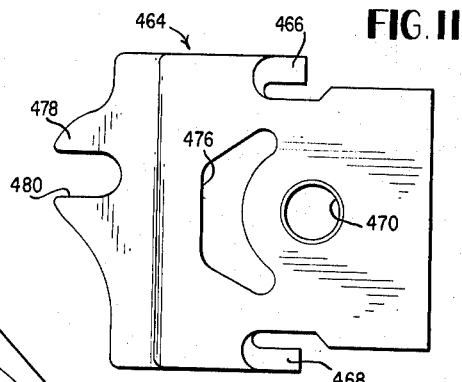
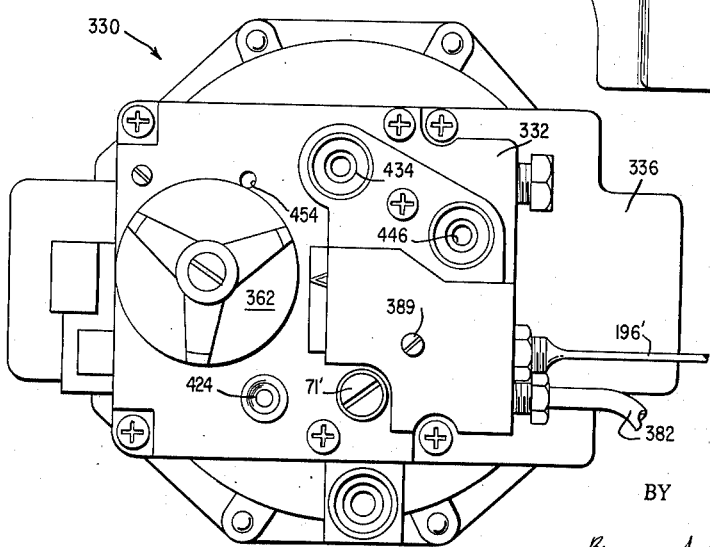

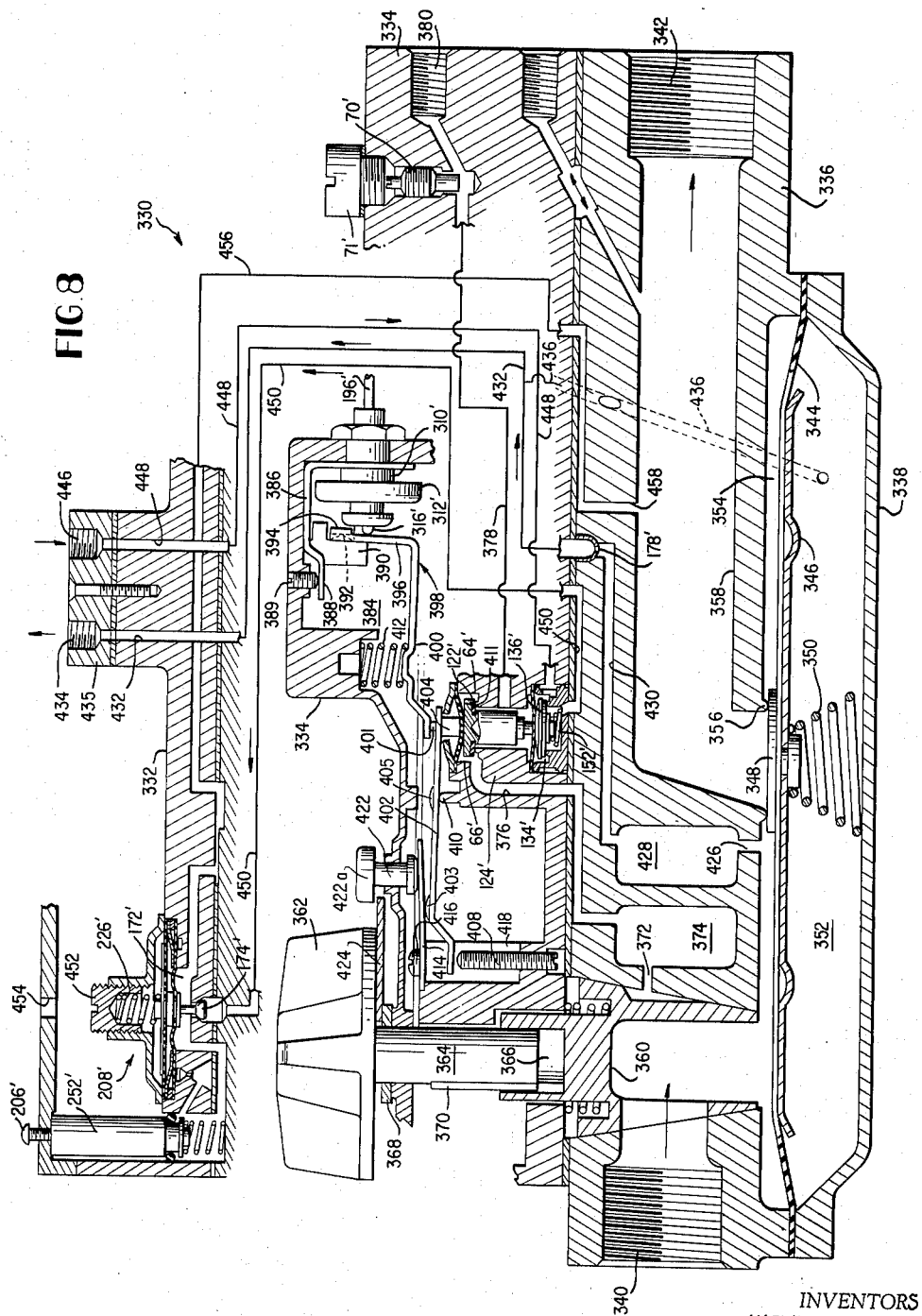

Feb. 15, 1966  M. M. GRAHAM ETAL  3,235,180
COMBINATION PRESSURE AND TEMPERATURE CONTROL
Filed Jan. 18, 1963  8 Sheets-Sheet 7

INVENTORS
MARVIN M. GRAHAM
JOHN W. WRIGHT
HENRY C. BRAUCKSIEK
BY
Browne, Schuyler and Beveridge
ATTORNEYS Feb. 15, 1966  M. M. GRAHAM ETAL  3,235,180
COMBINATION PRESSURE AND TEMPERATURE CONTROL
Filed Jan. 18, 1963  8 Sheets-Sheet 8
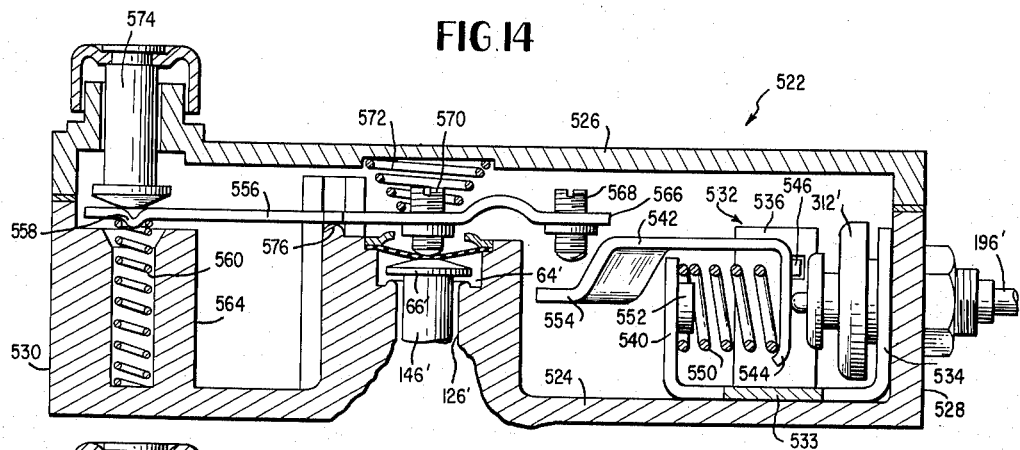
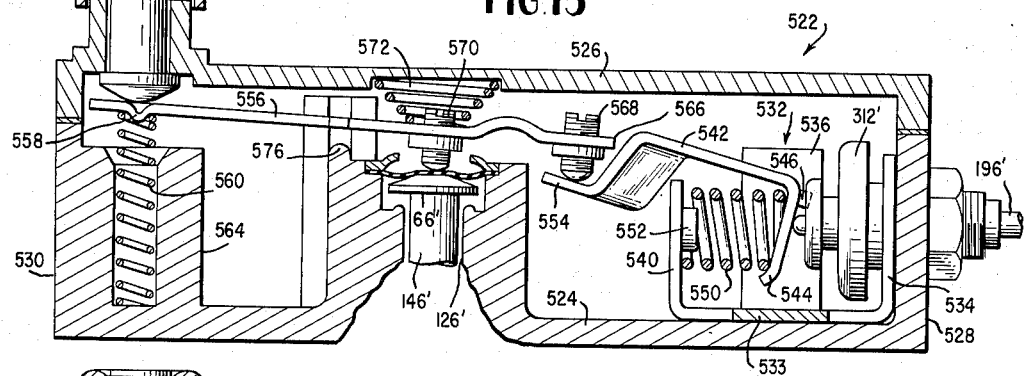
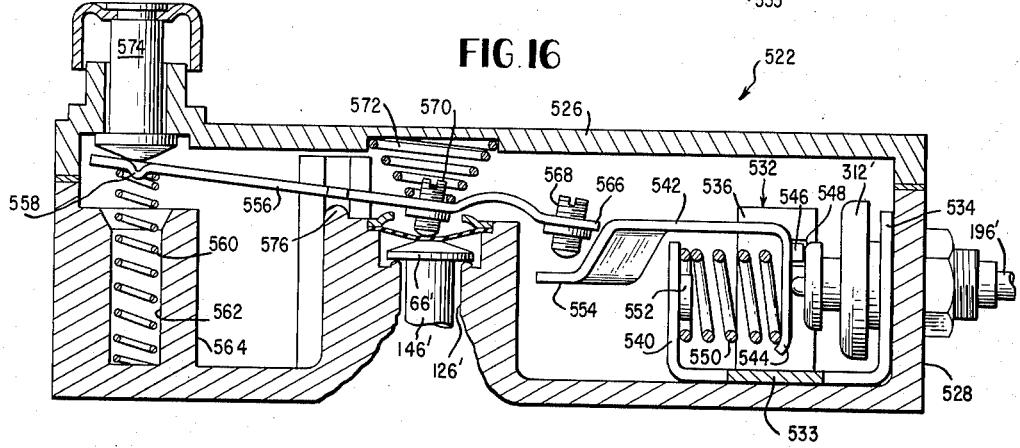
INVENTORS
MARVIN M. GRAHAM
JOHN W. WRIGHT
HENRY C. BRAUCKSIEK
BY Browne, Schuyler and Beveridge
ATTORNEYS United States Patent Office 3,235,180
Patented Feb. 15, 1966

3,235,180
COMBINATION PRESSURE AND TEMPERATURE CONTROL
Marvin M. Graham, San Pedro, John W. Wright, Long Beach, and Henry C. Braucksiek, Buena Park, Calif., assignors to Robertshaw Controls Company, Richmond, Va., a corporation of Delaware
Filed Jan. 18, 1963, Ser. No. 252,335
22 Claims. (Cl. 236—80)

This invention relates to combination controls for heating systems or the like having gaseous fuel burners, and particularly to combination controls for operating a fuel burner in response to varying conditions within a region heated by the burner.

An object of this invention is to provide a combination control for a fuel burner which regulates the rate of flow to the main burner, and which is thermostatically actuated to turn the main burner on and off in response to temperature variations at the region heated by the burner.

A further object is to provide a combination control for a fuel burner wherein a pressure regulator controls the rate of flow through a modulating valve to the burner, the pressure regulator in turn being adjusted in accordance with temperature variations in the region being heated by the burner.

A further object is to provide a combination control for a heating system or the like in which a pressure regulator controls the rate of flow through a modulating valve to the main burner of the system, with means for converting the pressure regulator for use with either liquid petroleum gas, or natural or manufactured gas.

Another object is to provide a combination control for a heating system in which the main fuel flow is controlled by a modulating valve responsive to a pressure differential which is variable in accordance with temperature changes.

A further object is to provide a combination control for a heating system in which both the main burner fuel and pilot burner fuel is shut off automatically in response to failure of the pilot flame.

Still another object is to provide a combination control in which the main burner fuel is controlled by a modulating valve sensitive to changes in a bleed line pressure regulator, the bleed line in turn being controlled by a thermostatically actuated control valve.

The foregoing and other objects are achieved by the provision of a combination control having an inlet connected with a source of fuel and an outlet connected with the main burner of the system. Fuel flow between the inlet and outlet is controlled by a modulating diaphragm valve positioned in the main passage between the inlet and outlet. Also connected between the inlet and the outlet is a bleed line which is controlled by a pressure regulator and a thermostatically responsive, snap-acting control valve. Pressure in the bleed line communicates with the opposite side of the diaphragm valve from the inlet so that fuel flow to the main burner is regulated in response to pressure differentials between the inlet and the bleed line.

The bleed line is controlled by thermostatically actuated control valves responsive to temperature variations in the region heated by the main burner to open and close the bleed line. When the control valves are closed, the pressures on both sides of the diaphragm valve are equal causing it to close and shut off the flow to the burner. When the control valves open, fuel flows from the inlet to the outlet through the bleed line causing a pressure drop, and the resulting pressure differential acts on the diaphragm valve to open the main fuel passage. Thereafter, the main burner fuel is modulated in accordance with the differential between the inlet pressure and bleed line pressure, the rate of flow in the bleed line being controlled by the pressure regulator.

The pressure regulator is provided with change-over mechanism for selectively connecting one of two pressure responsive diaphragms having different effective areas to the bleed line pressure to convert the control from liquid petroleum gas systems to natural gas systems. For liquid petroleum gas, the smaller diaphragm is exposed to the bleed line pressure, while if natural gas is employed, the larger diaphragm is connected with the bleed line pressure to sense the lower pressure which is encountered by natural gas.

Carried by the pilot valve is an override plunger which engages the bleed valve to prevent opening of the bleed line except when the pilot valve is fully open with the pilot burner ignited. Reset mechanism is provided to permit the flow of pilot gas only with the overide plunger holding the bleed valve closed until the pilot burner is ignited. Upon ignition of the pilot burner, thermally responsive mechanism operates in response to the pilot flame to hold the pilot valve open and permit release of the reset mechanism, whereupon the bleed valve is permitted to open by the override plunger. When the pilot flame is extinguished, both the pilot valve and bleed valve automatically close to shut off the flow through both the pilot line and the bleed line, respectively.

In one embodiment, an expansible thermostatic element senses the temperature at the region heated by the burner and is interconnected with both the control valve in the bleed line and the pressure regulator to snap actuate the control valve in response to temperature variations and simultaneously adjust the pressure regulator as the temperature varies. Consequently fuel flow to the main burner is reduced proportionately as the temperature increases, and when the selected temperature is reached, the control valve is snap actuated to close the bleed line and completely shut off the flow to the main burner.

In another embodiment, a portion of the bleed line comprises an external conduit controlled by thermostatic valves sensitive to the temperature of the region heated by the main burner. When the temperature sensed by the thermostatic valves is less than the set temperature, the bleed line opens to actuate the modulating valve and permit fuel to flow to the main burner until the thermostatic valves are satisfied.

Other objects and advantages will become apparent from the following description taken in connection with the accompanying drawings in which:

FIG. 4 is an enlarged sectional detailed view of the pressure regulator and thermostatic control means for actuating the control valve;

FIG. 7 is a plan view of a second combination control embodying the invention;

FIG. 8 is a schematic sectional view of the control of FIG. 7;

FIG. 9 is an elevational view of a typical heating system employing the control of FIG. 7;

FIG. 10 is an enlarged sectional detail of a modification of the combination control of FIG. 7;

FIG. 11 is a plan view of a bracket employed in the mechanism of FIG. 10;

FIGS. 13 through 16 are enlarged detailed views illustrating a modification of the actuating mechanism.

Figure 1:
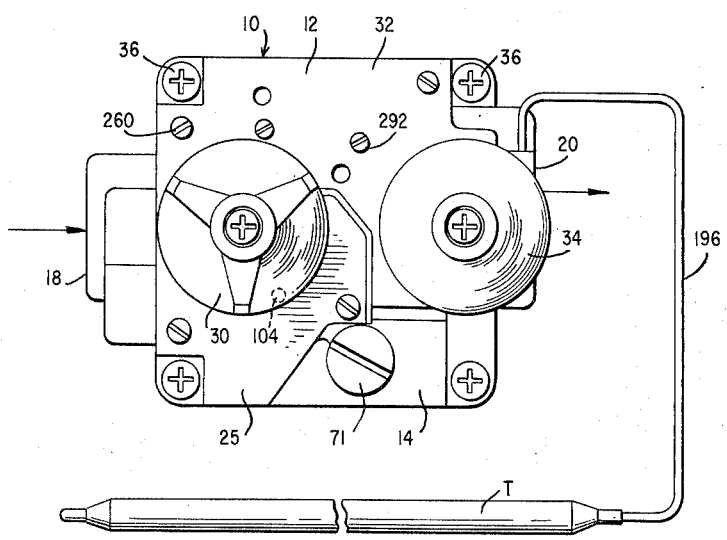
FIG. 1 is a plan view of one form of combination control embodying the invention.
Figure 2:
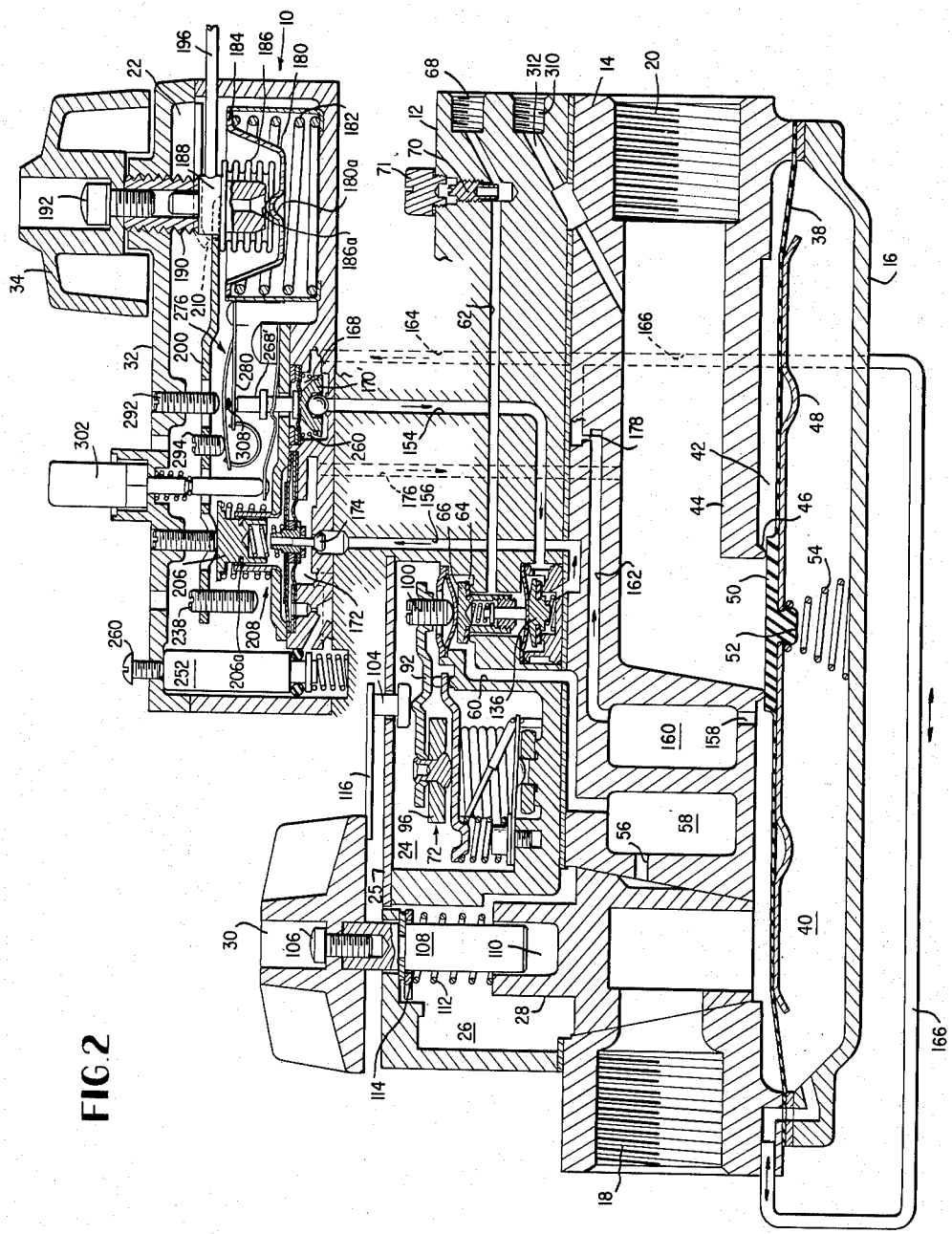
FIG. 2 is a schematic sectional view of the combination control of FIG. 1.

With reference to FIGS. 1 and 2, the combination control comprises a casing 10 made up of three sections, an upper section 12, a middle section 14, and a lower section 16. Sections 12, 14 and 16 are preferably metal castings. Middle section 16 is formed with an inlet 18 for connection with a fuel source and an outlet 20 for connection with a fuel burner. Upper section 12 is formed with a compartment 22 (FIG. 2) for housing actuating mechanism for the control valve and pressure regulator, and a compartment 24 containing a pilot valve and pilot valve actuating mechanism to be described in detail presently. For purposes of illustration, compartments 22 and 24 are illustrated schematically in FIG. 2 as being vertically displaced from each other. Casting 12 is also formed with a cavity 26 for receiving a gas cock 28 which is seated in a conical valve seat formed in casting 14 and provided with an adjusting knob 30. Compartments 22 and 24 are provided with cover plates 25 and 32, respectively. Alternatively, cover plates 25 and 32 may be integrally formed in one single piece. Rotatably mounted in a cover plate 32 of compartment 22 is a temperature adjusting knob 34. The castings are secured together in a conventional manner as by screws 36.

Secured at its periphery between castings 14 and 16 is a flexible diaphragm 38 forming a sensing chamber 40 beneath the diaphragm and an inlet chamber 42 between the diaphragm and casting 14. Outlet 20 is connected with inlet chamber 42 by a main passage 44 having an annular valve seat 46 formed about its inlet in chamber 42. Mounted on the lower side of diaphragm 38 is a diaphragm pan 48, and a valve element 50 is integrally molded with diaphragm 38 to cooperate with valve seat 46. Diaphragm pan 48 is secured to the diaphragm by a projection 52 integrally formed on the lower side of diaphragm 38 at its center. Valve element 50 is biased into engagement with valve seat 46 by a spring 54 mounted between projection 52 and the lower wall of chamber 40. Fuel flow from inlet chamber 42 through outlet 20 is therefore controlled in accordance with fluctuations in the pressure differential between chambers 40 and 42.

By rotating adjustment knob 30, gas cock 28 can be moved between "pilot gas only," "on" and "off" positions. When gas cock 28 is in the "pilot" position, fuel is admitted from inlet 18 to a port 56 leading to a pilot filter cavity 58 which may contain conventional filter bats preventing the entry of foreign matter into the pilot line. From filter cavity 58 the fuel flows through a pilot line consisting of passages 60 and 62. Passage 60 connects cavity 58 with a pilot valve chamber 64, and passage 62 connects pilot valve chamber 64 with the pilot outlet 68. Flow from pilot valve chamber 64 to passage 62 is controlled by a pilot valve 66. The rate of flow to the pilot outlet is controlled by an adjustable valve or key 70 threadedly mounted in a recess in casting 12, the recess being normally closed by a threaded cap 71 mounted in the casting. Pilot outlet 68 may be threadedly connected with a suitable conduit to conduct fuel to a pilot burner positioned adjacent the main fuel burner.

Fuel flow through the pilot line is controlled by pilot valve actuating mechanism 72 which is manually operable to move pilot valve 66 to an "ignition" position and is thermally responsive to the pilot burner flame to move the pilot valve automatically between "on" and "off" positions.

Figure 3:
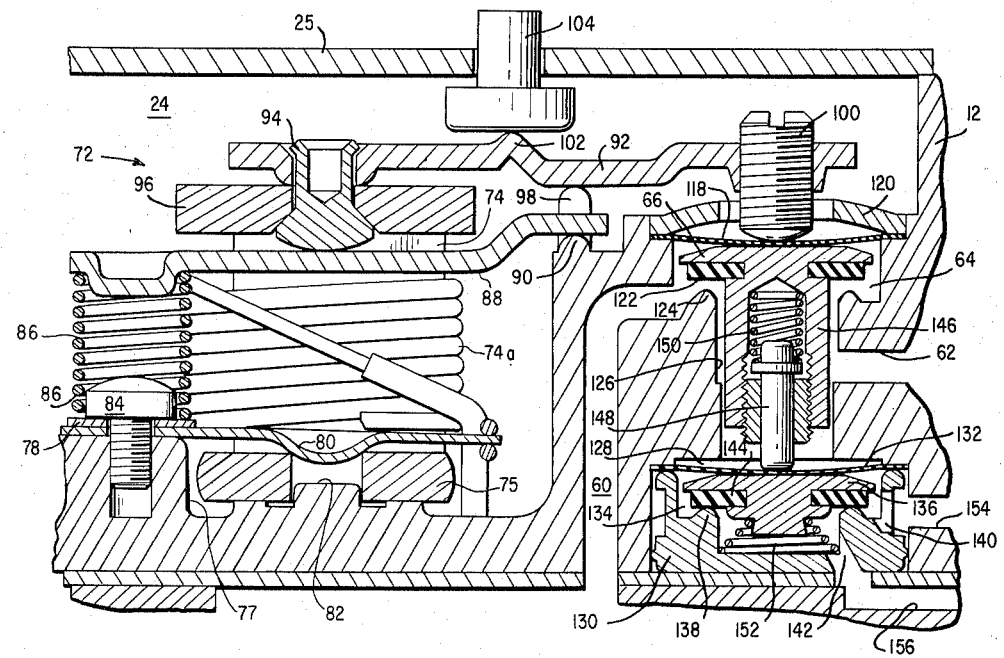
FIG. 3 is an enlarged detailed sectional view of the automatic pilot section of the combination control shown in FIG. 1.

With reference to FIG. 3, a U-shaped electromagnet 74, having a coil winding 74a, is mounted in compartment 24. Magnet 74 has its horizontal connecting portion 75 concentrically received on a boss 82 formed in the lower wall of compartment 24, and is held in place by a plate-like member 80 secured to a boss 77 by a screw 84. Screw 84 also serves to position a washer 78 over the portion of member 80 overlying boss 77.

Mounted on washer 78 concentrically with the head of screw 84 is a spring 86 which resiliently supports one end of a control lever 88 which is movable between the vertical legs of magnet 74 and has its other end pivotally supported on a fixed fulcrum 90 formed on one wall of compartment 24.

Pilot valve 66 is operated by a pilot valve actuating lever 92. Secured to one end of lever 92 by a rivet 94 is a magnetically responsive keeper member 96. Rivet 94 is pivotally supported on control lever 88. Actuating lever 92 is pivotally engageable with a fixed fulcrum 98 intermediate its ends and a threaded adjustment screw 100 is mounted in the end of actuating lever 92 opposite rivet 94. Actuating lever 92 is formed with a raised projection 102 at the portion between fixed fulcrum 98 and rivet 94 for engagement with a manually operable reset button 104, which, upon being depressed, causes actuating lever 92 to pivot counter-clockwise about fixed fulcrum 98.

With reference to FIG. 2, gas cock adjusting knob 30 is connected by means of a screw 106 with a stem 108 which is axially received in a recess 110 formed in gas cock 28. Stem 108 and recess 110 are provided with complementary flat surfaces, or stem 108 may be keyed to the wall of recess 110 so that stem 108 is axially movable relative to recess 110 but is not rotatable relative to the gas cock. Accordingly, gas cock 28 rotates with knob 30, however, adjustment knob 30 may be pushed downwardly toward the gas cock against the bias of a spring 112 supported between gas cock 28 and a spring seat member 114. Reset button 104 may be positioned to be engaged by the underside of adjustment knob 30, or as schemtaically indicated in FIG. 2, an arm member 116 extends from reset button 104 which, upon depression of adjustment knob 30 toward cover plate 25, moves reset button 104 downwardly against projection 102 of actuating lever 92.

Again referring to FIG. 3 a sealing diaphragm 118 is mounted in the upper wall of pilot valve chamber 64 and is secured at its periphery to an annular shoulder at the upper periphery of chamber 64 by a valve retainer 120. Pilot valve 66 is provided with an annular, resilient valve element 122 which cooperates with an annular valve seat 124 to control the flow between passages 60 and 62 of the pilot line. Extending beneath pilot valve chamber 64 is a cylindrical cavity 126 which communicates at its lower end with a compartment 128.

Mounted in compartment 128 is a valve seat insert 130. Secured at its periphery between the upper periphery of valve seat insert 130 and the upper wall of compartment 128 is a sealing diaphragm 132 which forms the upper wall of a bleed valve chamber 134. Insert 130 is formed with an annular valve seat 138, an inlet port 140 for chamber 134, and an outlet port 142. Resilient annular valve face material 144 is mounted on bleed valve 136 to cooperate with valve seat 138 and control the flow between inlet port 140 and outlet port 142.

Pilot valve 66 is formed with a downwardly depending cylindrical stem 146 which is reciprocally mounted in cylindrical cavity 126. Slidably mounted in the hollow stem 146 is an override plunger 148 which is biased by a spring 150 to extend or project from stem 146. Plunger 148 engages diaphragm 132 and urges bleed valve 136 into engagement with valve seat 138. Bleed valve 136 is biased away from valve seat 138 by a bleed valve spring 152. Inlet 140 of bleed valve chamber 134 is connected with a bleed passage 154, and outlet 142 is connected with a bleed passage 156.

Assuming that magnet 74 is electrically connected with a thermocouple positioned to sense the heat from the pilot burner, when the pilot flame is out, magnet 74 is deenergized, and spring 86 acts through lever 88 to fulcrum lever 92 about reset button 104 at 102 to close pilot valve 66 against valve seat 124. Since the force of spring 86 is sufficient to overcome both springs 150 and 152, override plunger 148 acts to close bleed valve 136 against valve seat 138. This is the "off" position of the pilot valve.

To move pilot valve 66 to its "ignition" position, reset button 104 is depressed against projection 102, moving lever 92 into engagement with fulcrum 98 and causing it to pivot counterclockwise about fulcrum 98 until keeper 96 engages magnet 74. In this position, screw 100 is preset so that pilot valve 66 opens to connect passages 60 and 62, but not sufficiently to permit bleed valve 136 to open due to the force of spring 150. Thus, bleed valve 136 remains closed to permit the flow of pilot gas only.

The pilot burner is then ignited, and reset button 104 is held in its depressed position until the thermocouple is heated by the pilot flame sufficiently to energize magnet 74. As soon as the magnet is energized, reset button 104 may be released causing lever 92 to pivot counter-clockwise about rivet 94 due to the force of springs 150 and 152 permitting bleed valve 136 to open. Keeper 96 is retained in position against magnet 74 by the magnetic attraction.

With reference to FIG. 2, assuming that the pilot burner has been ignited and magnet 74 has been energized with pilot valve 66 and bleed valve 136 in their open positions, adjustment knob 30 may then be rotated to move the gas cock 28 to its full "on" position. In this position, fuel from inlet 18 is admitted through gas cock 28 into chamber 42. Chamber 42 communicates through a port 158 with a bleed line filter cavity 160 connected with a bleed line having a first portion consisting of bleed passages 162, 164, 154 and 156.

Bleed passage 162 extends from filter cavity 160 to bleed passage 164 and a connecting conduit 166 which communicates with chamber 40 beneath diaphragm 38. Passage 164 communicates with a control valve chamber 168 in which is positioned a control valve 170 operative to control communication between passages 164 and 154. When control valve 170 is open, fuel flows from passage 164 into passage 154 and from passage 154 through bleed valve chamber 134 into bleed passage 156 which communicates with the inlet of a pressure regulating chamber 172 which in turn is controlled by a pressure regulating valve 174.

The second portion of the bleed line consists of a bleed passage 176 extending from the outlet of pressure regulating chamber 172 to main passage 44. A restriction 178 is preferably positioned in passage 162 to amplify the pressure drop between chambers 40 and 42 when the bleed line is open as will presently be described.

When control valve 170 is closed, fuel from inlet 18 flows through conduit 166 to chamber 40 beneath the diaphragm valve 138, and the pressures on both sides of the diaphragm are equal. Spring 54 acts to close valve face 50 against valve seat 46 shutting off communication between inlet 18 and outlet 20. When control valve 170 is open, the pressure drop across restriction 178 causes a drop in pressure in chamber 40 permitting diaphragm valve 38 to open and permitting fuel flow through main passage 44 to outlet 20. Pressure regulating valve 174 controls the rate of flow through the bleed line when control valve 170 and bleed valve 136 is open.

Operation of the pressure regulator and control valve can best be understood with reference to FIGS. 2 and 4. Resiliently supported in compartment 22 by a spring 182 is a retaining cup 180. Spring 182 has one end seated on the lower wall of compartment 22 and its other end seated against the underside of a flange or rim 184 formed at the upper periphery of retaining cup 180. Retaining cup 180 has received therein the movable end of an expansible thermostatic element 186 in the form of a bellows or capsule. Capsule 186 has its upper wall connected with a plug member 188 having a reduced portion which is received in the hollow, threaded stem 190 of temperature adjusting knob 34. Knob 34 is secured to stem 190 by a screw 192. The lower movable wall of capsule 186 has a central raised indentation 186a which cooperates with a raised indentation 180a, formed in the bottom wall of retaining cup 180. Since the upper wall of capsule 186 is fixedly connected to stem 190, expansion of capsule 186 causes the lower wall to move downwardly carrying with it cup 180 and compressing spring 182.

Thermostatic element 186 communicates at its interior with a capillary tube 196 extending from a temperature sensing bulb T (FIG. 1) positioned to sense the temperature controlled by the main burner. Sensing bulb T, capillary tube 196, and expansible capsule 186 comprise a closed system which is filled with a temperature sensitive fluid that expands and contracts upon increases and decreases in the temperature sensed by bulb T. Hence, as the temperature at bulb T rises, capsule 186 expands urging retaining cup 180 in a downwardly direction against the bias of spring 182. Conversely, upon cooling of bulb T, capsule 186 contracts permitting cup 180 to move upwardly due to the expansion of spring 182.

Mounted in compartment 22 above cup 180 and expansible capsule 186 is a fulcrum bracket 198. Expansion and contraction of capsule 186 is transmitted by a lever 200 having a forked or bifurcated end 202, the legs of which are pivotally supported on rim 184 of retaining cup 180. Lever 200 is formed with an apertured depression 204 adjacent its opposite end from the retaining cup which is supported on a flanged plunger 206 of a pressure regulator 208. Lever 200 is fulcrumed between depression 204 and end 202 about a knife-edged fulcrum 210 formed on bracket 198. Thus, as capsule 186 expands with rising temperature, rim 184 moves downwardly causing clockwise pivotal movement of lever 200 about fulcrum 210, and conversely, contraction of capsule 186 due to falling temperature causes rim 184 to move upwardly and rotate lever 200 in a counterclockwise direction about fulcrum 210.

Projecting upwardly from the central portion of the upper wall 212 of pressure regulator 208 is a cylindrical sleeve 214. Plunger 206 is reciprocably received in sleeve 214 and is resiliently supported on upper wall 212 by a spring 216 seated between wall 212 and the underside of the flange of plunger 206. A resilient O-ring seal 206a is received in a cooperating groove in plunger 206 to provide a slidable seal between plunger 206 and the iner wall of sleeve 214.

Pressure regulating chamber 172 is provided with a pressure responsive movable wall 218 which consists of a pair of axially spaced, flexible diaphragms 220 and 222 concentrically mounted at their peripheries between wall 212 and the lower wall of compartment 22. Diaphragms 220 and 222 are secured together at their central portions by a flanged valve operating member 224. Movable wall 218 is biased in a downward direction to contract pressure regulating chamber 172 by a spring 226 having one end received in a recess formed in plunger 206, and its other end seated on a backing plate 228 concentrically mounted on diaphragm 222.

Regulating valve 174 cooperates with a valve seat 229 formed at the inlet of pressure regulating chamber 172 to control the flow of fluid from bleed passage 156 into the pressure regulating chamber. Regulating valve 174 is formed with a valve stem 230 which extends into chamber 172 and is press-fitted to valve operating member 224.

Plunger 206 abuts the lower end of an adjustment screw 236 threadedly mounted in cover plate 32. Screw 236 limits the upward travel of plunger 206 thereby providing a minimum setting for the regulated outlet pressure of pressure regulating chamber 172.

Mounted on the end of lever 200 is a second adjustment screw 238 which is movable into engagement with wall 212 upon counterclockwise pivotal movement of lever 200 about fulcrum 210 to limit the maximum pressure in chamber 172. As expansible capsule 186 contracts to raise rim 184 of retaining cup 180, lever 200 pivots counterclockwise about fulcrum 210 and increases the biasing force on spring 226 thereby increasing the pressure required in chamber 172 to close regulating valve 174. Consequently, the pressure regulator is adjusted in accordance with temperature variations as sensed by bulb T within the limits determined by settings of screws 236 and 238.

Pressure regulator 172 communicates with bleed passage 176 through an outlet port 240 and also communicates through a bypass passage 242 with a change-over valve chamber 244. Chamber 244 communicates with the space 246 between diaphragms 220 and 222 through a passage 248 and an orifice 250. Diaphragm 222 is larger in effective area than diaphragm 220, and accordingly, when the pressure in regulating chamber 172 acts only on diaphragm 220, a larger pressure will be required to close valve 174 than would be the case if the pressure were exposed to the larger effective area of diaphragm 222.

Movably mounted in compartment 22 and chamber 244 is a change-over valve plunger 252 which is biased in an upward direction by a spring 254 received in chamber 244. Change-over valve plunger 252 is formed with a groove 256 adjacent its lower end which receives an O-ring 258 for selectively opening and closing passage 248 to the space 246 between the diaphragms. Threadedly mounted in the cover plate 32 is a screw 260 which engages the upper end of change-over valve 252. When screw 260 is retracted to the position illustrated in FIG. 4, spring 254 urges plunger 252 upwardly against cover plate 32 and O-ring 258 uncovers passage 248. By rotating screw 260, change-over valve 252 can be moved downwardly against spring 254 until the O-ring covers passage 248 and shuts off communication between regulating chamber 172 and space 246.

Therefore, if the control is to be used in a liquid petroleum gas system at higher pressures, change-over valve 252 is moved to its lower position so that the effective area of diaphragm 220 only is exposed to the pressure in chamber 172, since the pressures encountered with liquid petroleum gas are much higher than those encountered with natural or manufactured gas. Change-over valve plunger 252 is moved to the position illustrated in FIG. 4 connecting regulating chamber 172 with the larger effective area of diaphragm 222 to convert the control to natural gas.

Lever 200 is interconnected with the control valve 170 controlling communication between bleed passages 164 and 154 to snap actuate the control valve to open and close the bleed line.

With reference to FIG. 4, control valve 170 is provided with a ball valve element 170a which cooperates with an annular valve seat 262 to control communication between bleed passages 164 and 154. Valve 170 is biased into engagement with valve seat 262 by a spring 264. Peripherally mounted in the upper wall of chamber 168 is a sealing diaphragm 266, the central portion of which is clamped between valve 170 and a valve stem 268. Valve 170 is formed with a threaded projection which extends through the central portion of the diaphragm and is threadedly connected with a recess formed in the hollow valve stem 268.

Valve 170 is snap actuated between open and closed positions by a leaf spring 276 having a rectangular portion cut away from its center to define a pair of outer blades 278 and an inner or center blade 280. Leaf spring 276 is supported at one end on a post 282 by a screw 284. To provide snap actuation of spring 276, an over-center roll spring 286 has one end 288 connected with the free end of center blade 280 and its other end 290 connected to the portion of spring 276 which connects the outer ends of blades 278.

Threadedly mounted in cover plate 32 of compartment 22 is an adjustable, fixed abutment 292 in the form of a screw which extends through an opening in lever 200 above center blade 280 of leaf spring 176. Movement of lever 200 is transmitted to spring 276 by a movable abutment 294 in the form of a screw mounted on lever 200 which contacts the portion of leaf spring 276 connecting the ends of blades 278. The ends 288 and 290 of roll spring 286 are in compression between blades 278 and 280. Consequently, with blades 278 in the position shown in FIG. 4, the lines of force between ends 288 and 290 tend to move the center blade 280 in an upward direction. As lever 200 pivots clockwise about fulcrum 210, abutment 294 moves upwardly relaxing the force on blades 278. As soon as the lines of force between ends 290 and 288 change direction, center blade 280 is immediately snapped downwardly.

Valve stem 268 is formed with a groove or reduced portion 308 in its upper end. Central blade 280 of leaf spring 276 is engaged with groove 308 to positively actuate valve stem 268 with movement of blade 280. Therefore, as lever 200 pivots in a counter-clockwise direction about fulcrum 210, the line of force between ends 290 and 288 tend to urge the central blade 280 in an upward direction, and, as soon as the upward forces overcome spring 264, valve 170 is snapped upwardly until an eyelet member 309 carried by stem 268 at its upper end strikes screw 292, thus permitting flow from bleed passage 164 to bleed passage 154. Conversely, clockwise movement of lever 200 relaxes the forces on blades 278 until the point is reached where the lines of forces between ends 290 and 288 change direction to close valve 170 with a snap action.

Temperature adjusting knob 34, and abutments 292 and 294 are adjusted so that when the temperature sensed by bulb T is less than the set temperature, the resulting contraction of capsule 186 and counter-clockwise movement of lever 200 causes valve 170 to snap open. Conversely, when the temperature at bulb T rises above the set temperature lever 200 pivots clockwise until blades 278 reverse their position and cause blade 280 to snap control valve 170 to its closed position.

If it is desired to open valve 170 at a temperature above the set temperature, manual operating means is provided to open valve 170 against the force of blade 280. Mounted on the lower wall of compartment 22 is a leaf spring 296 which has one end secured to the lower wall of the compartment by a screw 298. Leaf spring 296 is formed intermediate its ends with a raised, apertured projection 300 which surrounds valve stem 268 and is engageable with a shoulder 274 formed by a reduced portion of the valve stem. In its unstressed position, blade 296 will move upwardly to engage shoulder 274 and open valve 170 against the force of springs 276 and 264. Manual operation of spring 296 is provided by an operating plunger 302 reciprocably mounted in cover plate 32 and provided with a stem 304 which engages the free end of spring 296. Plunger 302 is biased in a downward direction by a spring 306 seated between a shoulder formed on stem 304 and a recess in the upper wall of compartment 22. Spring 306, in its unstressed position overcomes spring 296 to urge it out of engagement with shoulder 274. To manually open valve 170, plunger 302 is lifted against the bias of spring 306 permitting blade 296 to engage shoulder 274 and open valve 170.

In operation, inlet 18 is connected with a source of fuel under pressure and outlet 20 is connected with the main burner (not shown) of the system. Pilot outlet 68 is connected with a pilot burner (not shown) which is positioned adjacent the main burner. Magnet 74 of the pilot actuating mechanism is electrically connected with a thermocouple positioned adjacent the pilot burner so that the magnet will be energized by the thermocouple when it is heated by the pilot flame and will be de-energized on cooling of the thermocouple when the pilot flame is extinguished.

Sensing bulb T is positioned in the region to be heated by the burner which may be a room or a water tank. Temperature adjusting knob 34 is adjusted to set the temperature at which the control valve will be actuated to open and close the bleed line. If the fuel employed is natural gas with inlet pressures in the range of 5 inches water column to 14 inches water column, and outlet pressures generally in the range between 2 inches water column and 7 inches water column, screw 260 is rotated to position change-over plunger 52 in its upper position to connect regulating chamber 172 with space 246 between diaphragms 220 and 222. The larger diaphragm 222 is provided to sense the outlet pressures within the range of natural gas. When liquefied petroleum gas is employed, the relatively high inlet pressures encountered, generally within the range of 11 inches to 25 inches water column with controlled outlet pressures in the range of 11 inches water column, change-over plunger is moved to its lower position closing passage 248 so that the small diaphragm 220 only is connected to sense the pressure in chamber 172.

With the system connected as above, and gas cock 28 in its "off" position, magnet 94 of the pilot actuating system is de-energized since the pilot burner is extinguished, and both pilot valve 66 and bleed valve 136 are seated against their respective valve seats due to the force of spring 86 acting through levers 88 and 92. To start the system into operation, gas cock 28 is rotated to the "pilot gas only" position connecting port 56 and pilot filter cavity 58 only with inlet 18. Gas cock 28 is constructed in such a manner that in the "pilot gas only" position, communication between chamber 42 and inlet 18 is cut off, however, fuel can flow to port 56 from inlet 18. Since pilot valve 66 is seated against valve seat 124, the pilot line is closed, and no fuel can flow to passage 62 which is connected with the pilot burner.

To ignite the pilot burner, adjusting knob 30 is depressed to actuate reset button 104 moving pilot actuating lever 92 into engagement with fixed fulcrum 98 and causing it to rotate counterclockwise about fulcrum 98 until keeper 96 stops against the poles of magnet 74 permitting pilot valve 66 to move to its "ignition" position in which the pilot line is open, the bleed passage remaining closed by valve 136 due to the force of spring 150. Fuel then flows through the pilot line to the pilot burner where it is ignited. Reset button 104 is held in its depressed position until magnet 74 is energized whereupon keeper 96 is held against the pole faces of magnet 74. Release of reset buttons 104 causes lever 92 to rotate in a counterclockwise direction about rivet 94 to move pilot valve 66 to its "on" position reducing the force of spring 150 sufficiently to permit bleed valve 136 to be opened by spring 152. Safe lighting of the pilot burner is therefore provided since in the "ignition" position, plunger 148 closes bleed valve 136 while at the same time spring 150 opens the pilot line.

With the pilot burner ignited and magnet 74 energized, reset button 104 is released. Gas cock 28 is then rotated to its full "on" position to connect inlet 18 with chamber 42. With the gas cock in the full "on" position, fuel is conducted both to chamber 42 and to the pilot line through port 56 and passage 60. Assuming that valve 170 is closed, fuel flows through port 158, bleed line filter cavity 160, and bleed passages 162 and 164 to valve chamber 168. Chamber 40 is also connected with bleed line presure through passage 166, and since valve 170 is closed, the pressures in chambers 40 and 42 are equal and valve element 50 is seated against valve seat 46.

As the temperature at bulb T declines, thermal element 186 gradually contracts causing counterclockwise movement of lever 200 which increases the opening force on regulating valve 174 and moves abutment 294 downward against spring 276. As soon as the set low temperature is reached, abutment 294 causes spring 276 to snap open the valve.

With the bleed line opened by valve 170, fuel flows to bleed valve chamber 134 through passage 154, past bleed valve 136 through passage 156 to regulating chamber 172, and from regulating chamber 172 through bleed passage 176 to main passage 44. When the bleed line opens, there is a consequent pressure drop across restriction 178 which is transmitted to chamber 40, and diaphragm valve 38 opens against spring 54 due to the greater pressure in chamber 42 over that in chamber 40. Diaphragm valve 38 then modulates the flow from inlet 18 through main passage 44 to the burner in accordance with variations in the rate of flow through the bleed line as controlled by regulating valve 174.

Fuel escaping from the main burner is immediately ignited by the pilot flame and the temperature at bulb T begins to rise. Thermal element 186 gradually expands with the rising temperature causing clockwise rotation of lever 200 about fulcrum 210, proportionally reducing the force on regulating plunger 206. As soon as the high set temperature is reached at bulb T, spring 276 snap actuates valve 170 to its closed position to shut off flow through the bleed line again equalizing the pressures on both sides of the diaphragm valve 38 to shut off the flow to the main burner through passage 44.

If the pilot flame should at any time be extinguished, magnet 74 is de-energized to release keeper member 96 from the magnet, and support spring 86 acts through support lever 88 to pivot lever 92 clockwise about reset button 104 to close both bleed valve 136 and pilot valve 166 to shut off both pilot and main burner fuel.

To change from natural gas to liquid petroleum gas, screw 260 is rotated to move change-over plunger 252 downwardly to shut off port 248 from regulating chamber 172 so that only the small diaphragm 220 will be exposed to the pressure in regulating chamber 172.

Communicating with main passage 44 through a passage 312 is a pressure tap 310 for measuring pressure.

Figure 5:
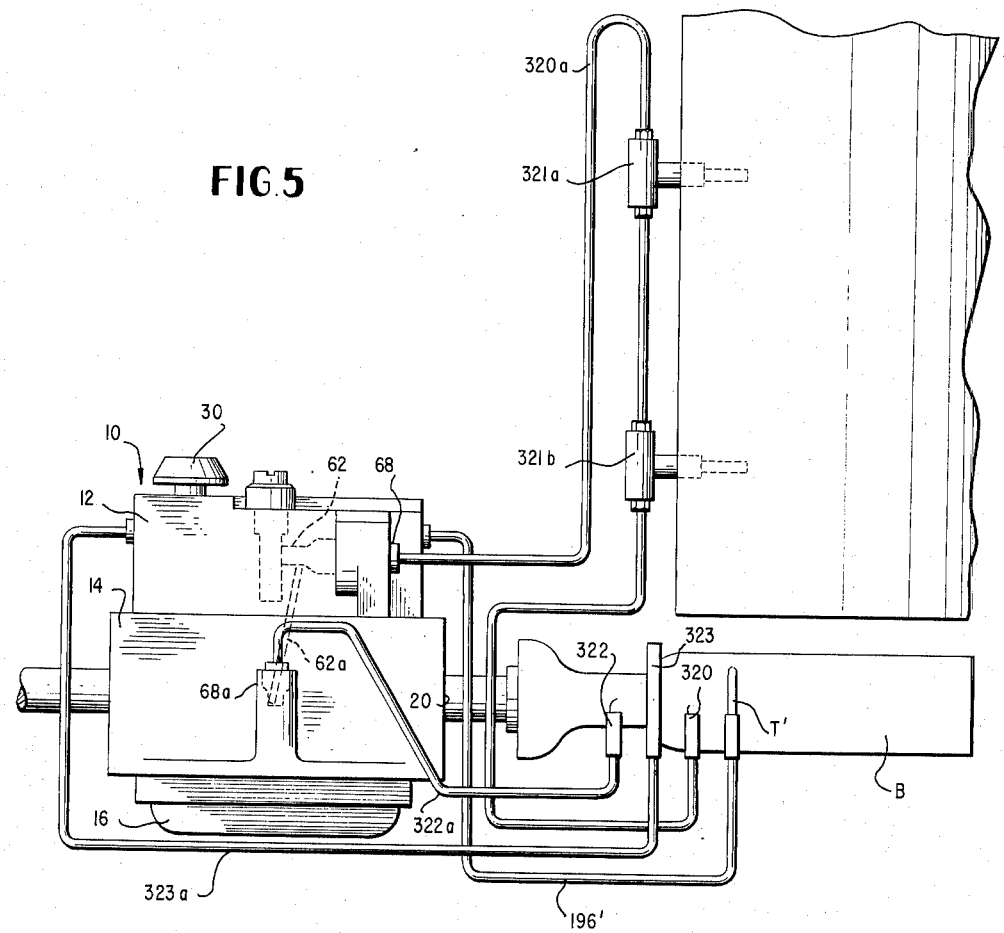
FIG. 5 is a diagrammatic view of a system including a modification of the control of FIGS. 1 and 2.
Figure 6:
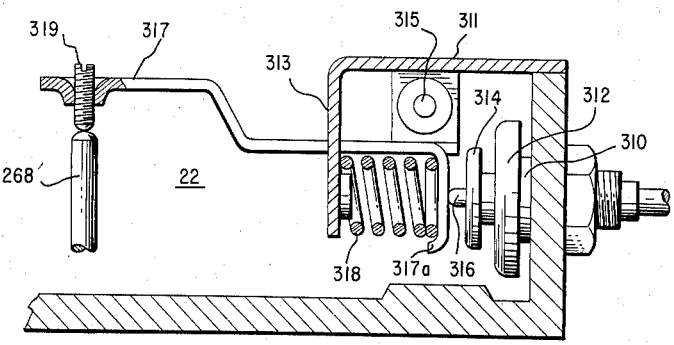
FIG. 6 is a detailed view of a thermally responsive valve operator for the system of FIG. 5.

FIGS. 5 and 6 illustrate a system embodying a modified version of the control of FIGS. 1–4. Mounted in compartment 22 (FIG. 6) by a fitting 310 is an expansible power element 312 which communicates with sensing bulb T' through a capillary tube 196' (FIG. 5). Secured to the movable wall of power element 312 is a plunger 314 having a spherical plunger element 316 mounted on its outer end. Power element 312, capillary tube 196' and sensing bulb T' comprise a closed system which is preferably filled with mercury.

Mounted in compartment 22 above power element 312 is a bracket 311 having a depending leg 313. Pivotally mounted on bracket 311 at 315 is a lever 317. Lever 317 is formed with an actuating arm 317a which is biased into engagement with plunger element 316 by a spring 318 seated between leg 313 and actuating arm 317a. Lever 317 projects from actuating arm 317a at an angle out of the path of leg 313 and is freely pivotable relative to bracket 311.

Mounted in the free end of lever 317 is an adjusting screw 319 engageable with the stem 268' of control valve 170 (FIG. 4). When power element 312 is contracted upon cooling of bulb T', spring 318 acts to close valve 170 to shut off communication between bleed passages 164 and 154. Conversely, upon heating of the mercury to its vaporization temperature, the mercury flashes into vapor to rapidly expand power element 312 and the pivot lever 317 out of engagement with valve stem 268 to open control valve 170 with a snap action.

With reference to FIG. 5, casing 10 is provided with an alternate pilot outlet 68a which communicates with pilot passage 62 between the pilot valve and outlet 68 by means of a passage 62a in casing sections 12 and 14. The bleed passage, pilot passage and main fuel passage in the control of FIG. 5 are otherwise the same as in FIGS. 1–4.

Pilot outlet 68 is connected with an intermittent pilot burner 320 through a fuel conduit 320a. Conduit 320a is controlled by thermostatic valves indicated schematically at 321a and 321b which may be positioned to sense water temperature in a tank at upper and lower levels. Valves 321a and 321b open when there is a demand for heat permitting fuel to flow to the intermittent pilot 320 when pilot passage 62 is opened by pilot valve 66.

Outlet 68a is connected with a continuous pilot 322 through a fuel conduit 322a. Positioned adjacent continuous pilot 322 to be heated by its flame is a thermocouple element 323 connected by an electrical conductor 323a with magnet 74 of the pilot valve actuating mechanism. When continuous pilot 322 is burning, its flame heats thermocouple 323 to energize magnet 74 to maintain pilot valve 66 in its "on" position.

Sensing bulb T' is positioned adjacent intermittent pilot 320 to be heated by its flame. Accordingly, when both valves 321a and 321b open in response to a demand for heat, fuel is conducted to intermittent pilot 320 which is ignited by continuous pilot 322. Bulb T' is then heated by the flame of the intermittent pilot, and when the critical temperature is reached, power element 312 snap actuates control valve 170 to open the bleed line. The resulting pressure drop in chamber 40 (FIG. 2) permits diaphragm valve 38 to open and fuel flows to the main burner B where it is ignited by the pilots.

As soon as either of thermostatic valves 321a or 321b is satisfied, conduit 320a is closed extinguishing the intermittent pilot 320, and bulb T' cools to close valve 170 and shut off the main burner fuel.

With reference to the embodiment of FIGS. 7 and 8, the control comprises a casing 330 made up of sections 332, 334, 336 and 338, preferably in the form of metal castings. Section 336 is formed with a main inlet 340 and an outlet 342.

Secured at its periphery between sections 336 and 338 is a flexible diaphragm 344. Secured to the diaphragm 344 is a diaphragm pan 346 which is centrally connected with the diaphragm by a valve element 348 which may be integrally molded with diaphragm 344 as in the previously described embodiment. Valve element 348 and diaphragm 344 are biased in an upward direction by spring 350 mounted between pan 346 and the lower wall of a chamber 352 formed by diaphragm 344 and section 338. Diaphragm 344 forms a chamber 354 with the bottom wall of section 336. Chamber 354 communicates with outlet 342 through a ported valve seat 356 at one end of a main passage 358. Valve seat 356 is controlled by valve element 348 in response to pressure differentials between chambers 352 and 354.

Mounted in a conical valve seat between inlet 340 and chamber 354 is a gas cock 360 which is rotatable between "off," "pilot gas only," and "on" positions. Rotation of gas cock 360 is accomplished by a control knob 362 having a stem 364 projecting into a cavity 366 formed in the gas cock. Stem 364 of control knob 362 is provided with a key 370 which cooperates with a corresponding key-way in the wall of cavity 366 to prevent relative rotation between control knob 362 and the gas cock.

When gas cock 360 is rotated to the "pilot gas only" position, pilot valve chamber 64' is connected with inlet 340 through a port 372, a pilot filter cavity 374 and pilot passage 376. When the pilot line is opened by pilot valve 66', chamber 64' is connected through a passage 378 with a pilot outlet 380.

Referring to FIG. 9, pilot outlet 380 may be connected with a suitable conduit 382 for conducting fuel to a pilot burner P. Pilot adjustment key 70' is positioned in the passage 378 adjacent pilot outlet 380 to adjust the rate of flow through the pilot line. Positioned adjacent the pilot burner P to be heated by the pilot flame is a temperature sensing bulb T' with its capillary tube 196' connected with an expansible power element 312' mounted in an actuator compartment 384 in the casing.

Sensing bulb T', power element 312' and capillary tube 196' are preferably filled with mercury due to the characteristic of mercury of rapidly expanding when heated sufficiently to change from the liquid to vapor state. Mounted between flange 310' of the expansible power element and the vertical wall of compartment 384 is a fulcrum bracket 386. Bracket 386 is formed with an offset lip 388 on the free end of its horizontal leg. Lip 388 is in engagement with an adjusting screw 389 mounted in the upper wall of compartment 384.

Extending downwardly from the side of the horizontal leg of support bracket 386 is a support leg 390. Support leg 390 is formed with a notch having a knife-edge fulcrum 392 for cooperation with a pivot tab 394 projecting laterally from the actuating arm 396 of a pilot valve actuating lever 398. Actuating arm 396 is supported between fulcrum 392 and the spherical plunger element 316' of the expansible power element. It is apparent that expansion of power element 312' causes clockwise rotation of lever 398 about fulcrum 392.

Lever 398 is provided with a lever arm 400 which extends from the lower end of actuating arm 396 and is supported at one end 401 on a support lever 402. Support lever 402 has one end 404 engaged with pilot valve 66' and the other end 406 engageable with an adjustable support screw 408. Support lever 402 is movable into engagement intermediate its ends with a fixed fulcrum 410 between support screw 408 and pilot valve 66'. Actuating lever 398 is biased in a counterclockwise direction about fulcrum 392 by a spring 412 seated between lever 398 and a recess in the upper wall of compartment 384.

Mounted on the opposite side of fulcrum 410 from the pilot valve is a reset spring lever 414 which has one end supported by a screw 416 on a post 418 with its free end engageable with a projection 403 formed on support lever 402 between fulcrum 410 and support screw 408. The free end of spring lever 414 is biased into engagement with a reset plunger 422 and urges the reset plunger in an upward direction.

When temperatures sensing bulb T' is cooled, expansible power element 312' is contracted and spring 412, acting through lever 398, causes support lever 402 to pivot clockwise about fulcrum 410 and close pilot valve 66' and bleed valve 136' against their respective valve seats to close both the pilot line and the bleed line.

In the embodiment of FIG. 8, pilot valve 66' preferably is provided with an outwardly and upwardly inclined lower surface 411 with the result that the resilient annular element 122' serves as a flexible valve element cooperating with valve seat 124'. As a result, upon contraction of power element 312' causing corresponding rapid counterclockwise movement of lever 398 as the mercury changes from vapor to liqiud, pilot valve element 124' and bleed valve 136' close simultaneously shutting off both bleed gas and pilot gas.

Gas cock control knob 362 is provided with a dial plate 424 in the form of a circular segment which extends beneath cap 422a of reset plunger 422 when the gas cock is in the "on" position to prevent depression of the reset plunger. Dial plate 424 moves out of the path of cap 422a when the gas cock is in the "off" or "pilot" positions. To ignite the pilot burner, control knob 362 is moved to the "pilot" position and reset plunger 422 is depressed against reset spring 414 which in turn engages projection 403 and causes counterclockwise pivotal movement of support lever 402 about fulcrum 410 until end 406 comes to rest against support screw 408.

In this position of support lever 402, pilot valve 66' is opened by spring 150 (FIG. 3) while bleed valve 136' remains in its closed position. This is the "ignition" position in which the pilot line is open and the bleed line is closed. Reset plunger 422 is held in its depressed position until sensing bulb T' is heated by pilot burner P sufficiently to cause vaporization of the mercury causing power element 312' to rapidly expand. Expansion of the power element causes clockwise rotation of actuating lever 398 about pivot 392 against the bias of spring 412. Upon expansion of power element 312', reset plunger 422 may be released and both pilot valve 66' and bleed valve 136' move to their open position due to the biasing force of spring 150 and bleed valve spring 152', since the force of spring 412 has been removed by expansion of power element 312'. Lever 402 rotates counterclockwise about projection 405 which is moved into engagement with the upper wall of the compartment.

Gas cock 360 may then be turned to the "on" position to connect inlet 340 with chamber 54 and permit fuel to flow from chamber 354 through port 426 into bleed line filter cavity 428 and bleed passage 430 to a restriction 178'. Bleed passage 430 and restriction 178' are connected with a passage 432 extending to an external bleed line connection 434 in a boss 435 projecting from section 332.

External bleed connection 434 is connected with a conduit 438 (FIG. 9) which is controlled by thermostatic valves 440 and 442. Thermostatic valves 440 and 442 each have temperature sensing elements positioned within a water tank W heated by the main burner B. Valves 440 and 442 are set to open when the temperature in the tank is below a selected temperature to permit flow from conduit 438 to a conduit 444 connected with a bleed line connection 446 in boss 435. Connection 446 communicates through a passage 448 with bleed valve chamber 134'. The outlet of bleed valve chamber 134' is connected through a passage 450 with the inlet of pressure regulating chamber 172'.

Passage 432 is connected with a connecting conduit 436 communicating at its other end with chamber 352 beneath diaphragm valve 344. When either bleed valve 136', or thermostatic valves 440 or 442, the pressure beneath diaphragm valve 344 in chamber 352 is the same as the inlet pressure and, consequently valve element 348 is seated against valve seat 356, to shut off communcation between chamber 354 and main passage 358.

Spring 226' of pressure regulator 208' is seated in a cap 452 threadedly mounted in the upper wall of the pressure regulator. An opening 454 in the upper wall of casing 330 provides access to cap 452 for adjusting the bias of spring 226' on valve 174'.

With pilot burner P ignited, and gas cock 360 in its "on" position, the system of FIG. 8 operates as follows. When the temperature of the water in tank W is below the temperature setting of valves 440 and 442, the bleed line is open and fuel flows from passage 432 through conduits 438 and 444, and through passage 448 to bleed valve 136'. From bleed valve 136' the fuel flows through passage 450 to pressure regulating chamber 172' and from there through passage 456 and port 458 into passage 358. Opening of the bleed line causes a reduction in pressure in connecting conduit 436 and diaphragm valve 344 modulates the flow of fuel from inlet 340 to passage 358 in response to variations in the rate of flow through the bleed line as controlled by regulating valve 174'. When either of thermostatic valves 440 or 442 are satisfied, the bleed line will close to equalize the pressure in chambers 354 and 352 causing valve element 348 to close against valve seat 356 and shut off the flow to the burner.

FIGS. 10 and 11 disclose a modified arrangement of the fulcrum bracket for the pilot actuating lever. FIG. 11 illustrates a fulcrum bracket 464 having a pair of downwardly depending support legs 466 and 468. Bracket 464 is formed with a threaded mounting hole 470 for receiving a threaded fastener 472 which secures the bracket to the upper wall of compartment 384. V-shaped notches 474 are formed in each of support legs 466 and 468 and support bracket 464 is provided with a cut out 476 in the upper horizontal portion forward of mounting hole 470.

Projecting from the free end of fulcrum bracket 464 is an off-set lip 478 formed with a notch 480 for receiving the stem 482 of an adjustment screw 484 mounted in the upper wall of compartment 384. Pilot valve actuating lever 398a is formed with pivot tabs 486 at the ends of a reverse bend 488 formed in actuating arm 396a of the actuating lever. Actuating lever 398a is otherwise constructed identically with actuating lever 398 in FIG. 8.

By rotating adjustment screw 484 the pivot points of lever 398 can be shifted due to resiliency of fulcrum bracket 464. Downward movement of screw 484 causes bending of fulcrum bracket 464 about fastener 472 to vertically adjust the position of pivot notches 474 relative to power element 312'. Stem 482 cooperates with notch 480 to axially align the fulcrum bracket relative to power element 312'.

Figure 12:
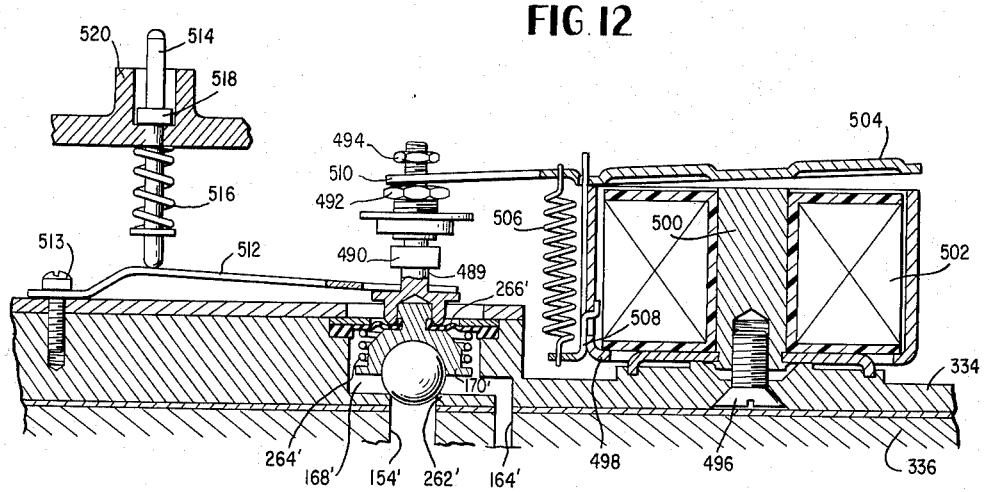
FIG. 12 is a detailed sectional view of an electromagnetic control device for the control valve.

FIG. 12 illustrates a magnetic operator for an internal thermostatic control valve for use with either the embodiment of FIG. 2 or FIG. 8. With reference to FIG. 12, control valve chamber 168' has its inlet connected with bleed passage 164' and its outlet connected with bleed passage 154'. Passages 154' and 164' correspond respectively with passages 448 and 432 of the embodiment of FIG. 8. Control valve 170' is connected with an actuating stem 489 which cooperates with valve 170' to clamp the central portion of sealing diaphragm 266'. Stem 489 is formed with an enlarged shoulder 490 and adjustable stops 490 and 492.

Secured to the lower wall of the center casting by a mounting screw 496 is a frame 498. Frame 498 supports a magnet core 500 surrounded by a coil 502. Pivotally mounted on frame 498 intermediate its end is an armature 504. Armature 504 is biased counterclockwise against the magnetic attraction of core 500 by a tension spring 506 having one end connected with armature 504 and the other end connected with a spring support bracket 508 secured to the frame. The end of armature 504 opposite magnet core 500 is notched or bifurcated to receive stem 489 and move axially along stem 489 between limit stops 492 and 494. When the magnet is de-energized, spring 506 acts through adjusting stop 492 to urge valve 170' against valve seat 262'.

Coil 502 is electrically connected with a thermostatically actuated switch (not shown) responsive to temperature changes in the region heated by the main burner. When the temperature is less than the thermostat setting, the magnet is energized and armature 504 pivots counterclockwise in response to the magnetic attraction, engages stop 494 to open valve 170' and connect passage 164' with passage 154'.

Manual operation is provided by a spring arm 512 which is secured to the casing by screw 513. Spring arm 512 is deflected downwardly by a manual operating plunger 514. Plunger 514 is biased in a downward direction by coil spring 516 seated between the upper wall of the compartment and a shoulder on the plunger. Spring 516 overcomes the resilient force of spring arm 512 to deflect spring arm 512 downwardly. Formed on operating plunger 514 is a non-circular locking shoulder 518. When manual operating plunger 514 is lifted against spring 516 to bring locking shoulder 518 to the top of a boss 520, the plunger can be rotated to a position in which locking shoulder 518 engages the top of boss 520 to lock the operating plunger in its upper position out of engagement with spring arm 512. Accordingly, spring arm 512 deflects upwardly and engages shoulder 490 on valve stem 489 to open valve 170' against the force of springs 506 and 264'.

The magnetic operator of FIG. 11 can be incorporated in the embodiment of FIGS. 2 and 4 in place of the thermal element and snap acting mechanism for the control valve 170, 170' or it can be incorporated in the embodiment of FIG. 8 in the place of the external bleed line thermostatic valves. With the embodiment of FIG. 2, magnet 74 of the pilot actuating mechanism is electrically connected with a thermocouple positioned adjacent the pilot burner, and coil 502 of the control valve operating mechanism is connected in circuit with a thermostatic switch to open and close the bleed line in response to temperature changes at the region heated by the main burner.

Similarly, with the embodiment of FIG. 8 sensing bulb T of expansible power element 312' is positioned to be operated by the pilot flame with the coil 502 connected electrically with a thermostatic switch responsive to temperature changes in the region heated by the main burner B such as a water tank or room.

FIGS. 13 through 16 illustrate another version of the pilot actuating mechanism. The pilot actuating mechanism is enclosed in a housing 522 having a bottom wall 524, end walls 528 and 530, and a cover member 526. Mounted in housing 522 is a fulcrum bracket indicated generally at 532 having a horizontal body portion 533 seated on bottom wall 524. Projecting upwardly from body portion 533 is an apertured mounting arm 534 which is clamped between flange 310' of the expansible power element and end wall 528 to secure the bracket to the housing. Projecting upwardly from opposite sides of body portion 533 is a pair of parallel pivot arms 536 and 538. Fulcrum bracket 532 is also formed with an upwardly projecting spring support arm 540 at its end opposite mounting arm 534.

Pivotally mounted on fulcrum bracket 532 is a pilot valve actuating lever 542. Lever 542 is formed with a downwardly depending actuating arm 544 having a pair of laterally extending pivot tabs 546 received in pivot notches 548 in pivot arms 536 and 538. Actuating arm 544 is biased into engagement with power element 312' by a spring 550 having one end seated against spring support arm 540 and the other end seated against actuating arm 544. Spring 550 is maintained in position on spring support arm 540 by a cylindrical boss 552.

When power element 312' is contracted due to cooling of its temperature sensing bulb, lever 542 is pivoted counterclockwise by spring 550 to the position illustrated in FIG. 14 in which an off set actuating tab 554 on the free end of lever 542 is in a substantially horizontal position out of engagement with the valve operating mechanism.

Pilot valve 66' is operated by a control lever 556 having one end 558 resiliently supported on a spring 560. Spring 560 is mounted in a cylindrical recess 562 formed in the boss 564 projecting from the lower wall 524 of housing 522. Threadedly mounted on the free end 566 of control lever 556 is an adjustment screw 568 which is axially disposed in the path of movement of actuating tab 554 of actuating lever 542. Clockwise movement of actuating lever 542 causes actuating tab 554 to engage adjusting screw 568 to rotate control lever 556 in a counterclockwise direction.

Threadedly mounted in an intermediate portion of control lever 556 for movement into and out of engagement with pilot valve 66' is a second adjustment screw 570. Adjustment screw 570 is biased into engagement with pilot valve 66' by a conical spring 572 seated between upper wall 526 and control lever 556, and surrounding adjusting nut 570.

Slidably mounted in cover member 526 is a reset plunger 574 which engages end 558 of control lever 556. Reset plunger 574 is biased in an upward direction by spring 560. When reset plunger 574 is depressed as illustrated in FIG. 14, control lever 556 is supported intermediate its ends on a fixed fulcrum 576 formed adjacent pilot valve chamber 64'.

Figure 13:
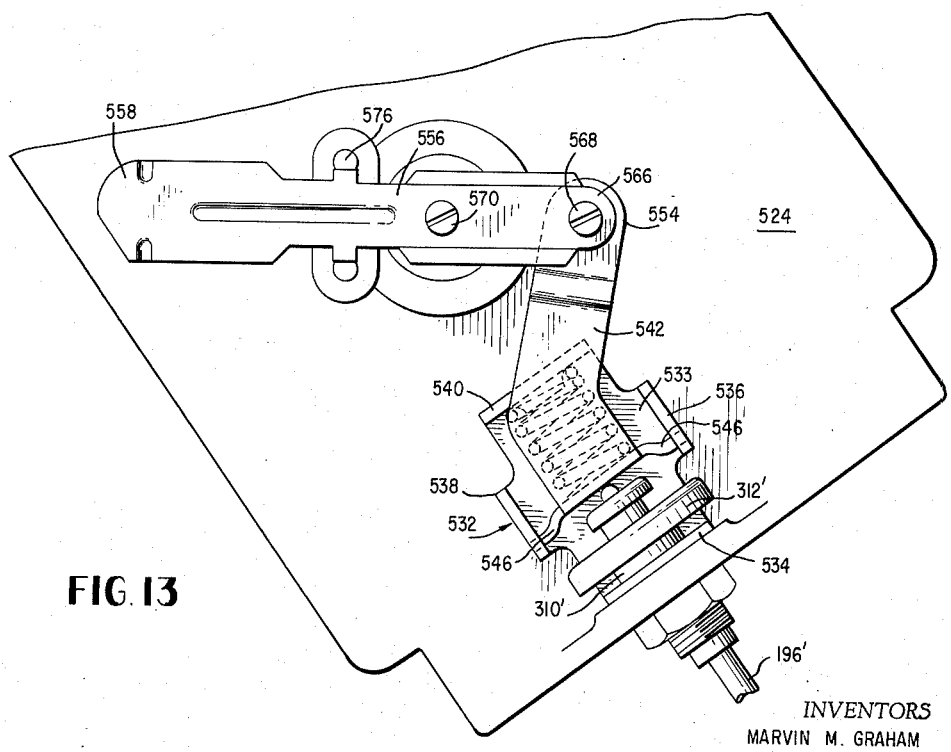

The sequence of operation is illustrated in FIGS. 13, 14, and 15. In FIG. 14 the mercury in power element 312' is cooled and the pilot flame is out. Upon depression of reset plunger 574, control lever 556 is pivoted in a counterclockwise direction about fixed fulcrum 576 until end 558 bottoms on the casting permitting pilot valve 66' to open and permit pilot fuel to flow to the pilot burner only. This is the "ignition" position and, as pointed out previously, bleed valve 136' is closed due to the force of spring 150 (FIG. 3). As soon as fuel is received at the pilot burner it is ignited and the temperature sensing bulb of power element 312' begins to be heated by the pilot flame.

As the temperature begins to rise, the mercury in power element 312' expands gradually at first while in its liquid state until actuating tab 554 of lever 542 engages adjusting screw 568. Upon a slight further increase in the temperature of the mercury, the mercury flashes into vapor causing rapid counterclockwise movement of actuating lever 542 to the position illustrated in FIG. 15. In this position, actuating tab 554 moves end 568 of control lever 556 in an upward direction, and when reset plunger 574 is released, control lever 556 is supported by spring 560 and actuating tab 554 out of engagement with fulcrum 576. In this position pilot valve 66' moves to the "on" position permiting bleed valve 136' to open as previously described. Accordingly, both the bleed line and pilot line is opened by the valve assembly constituting pilot valve 66' and bleed valve 136'. Fuel flows to the pilot burner so long as sensing bulb T' of power element 312' is heated by the flame.

Upon extinction of the pilot flame, temperature sensing bulb T' cools, and as the critical temperature is reached, the mercury in power element 312' liquefies and rapidly contracts permitting lever 542 to pivot counterclockwise about support arms 536 and 538 due to the bias of spring 550. As soon as actuating tab 554 moves out of engagement with adjusting screw 568, spring 572 is released and closes pilot valve 66' to shut off the flow in the pilot line and the bleed line (FIG. 16).

While several specific embodiments of the invention have been illustrated and described it should be understood that the invention is not limited to the specific construction illustrated but various alternations and modifications in the construction and arrangement of parts is possible without departing from the scope of the invention.

What is claimed is:
1. A combination control comprising:
an inlet for connection with a fuel source,
an outlet for connection with a fuel burner,
a main passage and a bleed line between the inlet and the outlet,
a thermal element operative to expand and contract in response to variations in temperature at the region heated by the burner,
a control valve movable to open and close the bleed line,
a pressure regulator in the bleed line for controlling the rate of flow through the bleed line when the bleed line is opened by the control valve element including a pressure responsive movable wall exposed to the atmosphere on one side and to the bleed line pressure on its other side, said control valve being positioned between said inlet and said regulator,
lever means connected between the pressure regulator and thermal element operative to proportionally adjust the pressure regulator in accordance with temperature variations,
snap acting mechanism connecting the control valve with the lever means operative to actuate the con- trol valve in response to contraction and expansion of the thermal element, and a pressure sensitive modulating valve operatively connected to sense the bleed line pressure and control the rate of flow through the main passage in accordance with the rate of flow in the bleed line.

2. A combination control comprising:

an inlet for connection with a fuel source, an outlet for connection with a fuel burner, a pressure regulating chamber having a pressure responsive movable wall, a bleed line having a first portion connecting the inlet with the pressure regulating chamber and a second portion connecting the pressure regulating chamber with the outlet, thermostatically actuated control valve means in the first portion of the bleed line operable to open and close the bleed line in response to temperature variations in the region heated by the burner, a pressure regulating valve movable in response to expansion and contraction of the pressure regulating chamber to decrease and increase respectively the rate of flow through the bleed line, means biasing the movable wall to its contracted position, and a pressure sensitive modulating valve operatively connected to sense pressure variations in the bleed line to control the rate of flow from the inlet to the outlet in accordance with the rate of flow through the bleed line.

3. A combination control as defined in claim 2 including:

a pair of axially spaced flexible diaphragms having different effective areas concentrically mounted at their peripheries forming the movable wall of the pressure regulating chamber, a port connecting the pressure regulating chamber with the space between the diaphragms, and a change-over valve movable in the port to control communication between the pressure regulating chamber and the space between the diaphragm to selectively increase or decrease the effective area of the movable wall.

4. A combination control as defined in claim 3 including:

an expansible thermal element operative to sense temperature variations at the region to be heated by the burner for operating the control valve means, and means operably connecting the thermal element with the movable wall of the pressure regulating chamber to vary the biasing force on the movable wall in response to expansion and contraction of the thermal element.

5. A combination control comprising:

an inlet for connection with a source of fuel, an outlet for connection with a fuel burner, a main passage connecting the inlet and the outlet, a pilot line connected with the inlet for conducting fuel to a pilot burner, a pressure regulating chamber having a pressure responsive movable wall, a bleed line having a first portion connecting the inlet with the pressure regulating chamber and a second portion connecting the pressure regulating chamber with the outlet, a valve in the pressure regulating chamber movable in responsive to pressure variations in the pressure regulating chamber to control the rate of flow in the bleed line, means adjustably biasing the pressure regulating valve to an open position, control valve means operable to open and close the first portion of the bleed line in response to temperature changes in the region heated by the burner, a pressure responsive modulating valve controlling communication between the inlet and the outlet in response to variations in the pressure differential between the bleed line and the inlet, a normally open bleed valve between the thermostatic valve and outlet movable to close the bleed line, a pilot valve in the pilot line movable to "on" and "ignition" positions to open the pilot line and movable to an "off" position to close the pilot line, an override plunger carried by the pilot valve resiliently engageable with the bleed valve to close the bleed valve when the pilot valve is in the "off" and "ignition" positions and movable to permit the bleed valve to open when the pilot valve is in the "on" position, and pilot valve actuating mechanism operable to actuate the pilot valve to the "ignition" position and thermally responsive to ignition of the pilot burner to actuate and maintain the pilot valve in the "on" position.

6. A combination control as defined in claim 5 including:

a pair of axially spaced, concentrically mounted flexible diaphragms forming the movable wall of the pressure regulating chamber with one of the diaphragms having a larger effective area than the other diaphragm, a port connecting the regulating chamber with the space between the diaphragms, and a change-over valve operably disposed in the port for selectively connecting the regulating chamber with the space between the diaphragms to increase or decrease the pressure response of the regulating valve.

7. A combination control as defined in claim 5 in which the pilot actuating mechanism comprises:

a fixed support, a control lever fulcrumed intermediate its ends with one end pivotally mounted on the support and the other end engaged with the pilot valve, a thermally responsive expansible power element having a remotely positioned temperature sensing bulb, a pilot actuating lever biased into engagement with said other end of the support lever to urge the pilot valve to the "off" position and to close the bleed valve and movable upon expansion of the power element to actuate the pilot valve to the "on" position and to open the bleed valve, and a reset plunger engageable with the support lever between said one end and the fulcrum to actuate the pilot valve from the "off" position to the "ignition" position while maintaining the bleed valve closed.

8. A combination control as defined in claim 5 in which the pilot actuating mechanism comprises:

a resilient support and a fixed support, a support lever mounted between the resilient and fixed supports, a pilot valve actuating lever fulcrum intermediate its ends with one end pivotally supported on the support lever and the other end pivotally engaged with the pilot valve, and biased by the support lever to urge the pilot valve to the "off" position and to close the bleed valve, a magnetically responsive keeper carried by said one end of the pilot valve actuating lever, a thermoelectrically actuated magnet energizable in response to ignition of a pilot burner controlled by the pilot valve to magnetically hold the keeper against the bias of the support lever to allow the pilot valve to move to its "on" position and the bleed valve to open, and a reset plunger engageable with the pilot valve actuating lever and the keeper to actuate the pilot valve to the ignition position while maintaining the bleed valve closed.

9. A combination control for a heating system having a main burner and a pilot burner comprising:
   an inlet for connection with a fuel source and an outlet for connection with the main burner,
   a bleed line communicating at one end with the inlet and at its other end with the outlet,
   a pilot line connected with the inlet for conducting fuel to the pilot burner,
   a normally open bleed valve controlling flow of fuel through the bleed line,
   a pilot valve controlling the pilot line and movable between "ignition," "on" and "off" positions,
   an override plunger carried by the pilot valve resiliently biased into engagement with the bleed valve,
   said override plunger biasing the pilot valve toward its "on" position and permitting the bleed valve to open only when the pilot valve is in the "on" position,
   a support lever having one end engaged with the pilot valve,
   an actuating lever biased into engagement with said one end of the support lever to close the pilot and bleed valves,
   reset means operable through the support lever to actuate the pilot valve to its "ignition" position,
   means expansible in thermal response to ignition of the pilot burner to pivot the actuating lever out of engagement with the pilot valve,
   means responsive to ignition of the pilot burner for causing the actuating lever to release the pilot valve permitting the pilot and bleed valves to move to their "on" and open positions, respectively, and
   a pressure responsive modulating valve between the inlet and the outlet sensitive to variations in the bleed line pressure for controlling flow to the main burner.

10. A combination control for a fuel burning system having a main burner and a pilot burner comprising:
    an inlet for connection with a source of fuel,
    an outlet for connection with the fuel burner,
    a pilot line connected with the inlet for conducting fuel to the pilot burner,
    a bleed line connected between the inlet and the outlet,
    control valve means movable to open and close the bleed line,
    means for operating the control valve means in response to temperature variations at the region heated by the main burner,
    a pressure regulating chamber in the bleed line having a pressure responsive movable wall,
    a normally open bleed valve in the bleed line between the control valve means and the pressure regulating chamber,
    a pilot valve movable to "on" and "ignition" positions to open the pilot line, and movable to an "off" position to close the pilot line,
    resilient means between the pilot valve and bleed valve biasing the bleed valve to its closed position when the pilot valve is in the "off" and "ignition" positions and permitting the bleed valve to open when the pilot valve is in the "on" position only,
    pilot valve actuating mechanism operable to move the pilot valve to the "ignition" position for lighting the pilot burner and including thermally responsive means operable to actuate the pilot valve between the "on" and "off" positions in thermal response to ignition and extinction of the pilot burner,
    and a pressure sensitive modulating valve controlling flow between the inlet and the outlet in response to pressure differentials between the inlet and the bleed line.

11. A combination control as defined in claim 10 in which the pilot valve actuating mechanism includes:
    a control lever fulcrumed intermediate its ends and operatively engaged with the pilot valve,
    means biasing the control lever to move the pilot valve to the "off" position,
    reset means engageable with the control lever to move the pilot valve from the "off" position to the "ignition" position,
    an actuating lever pivotally movable to engage the control lever and actuate the pilot valve to the "on" position,
    and means for operating the actuating lever to actuate the pilot valve from the "ignition" to the "on" position in thermal response to the pilot burner flame.

12. A combination control as defined in claim 10 in which the pilot valve actuating mechanism includes:
    a control lever fulcrumed intermediate its ends with one end engaging the pilot valve,
    an actuating lever having a free end biased into engagement with the control lever between the control lever fulcrum and the pilot valve to move the pilot valve to the "off" position,
    reset means engageable with the control lever to actuate the pilot valve to the "ignition" position,
    and a mercury filled expansible power element operatively connected to pivot the free end of the actuating lever out of engagement with the control lever in thermal response to the pilot burner flame to actuate the pilot valve to the "on" position.

13. A combination control as defined in claim 10 in which the pilot valve actuating mechanism includes:
    a control lever resiliently supported at one end and engageable with the pilot valve intermediate its ends,
    means biasing the control lever to move the pilot valve to the "off" position,
    a fulcrum between the pilot valve and the resiliently supported end of the control lever,
    reset means engageable with the resiliently supported end to pivot the control lever about the fulcrum and actuate the pilot valve to the "ignition" position,
    a thermally responsive expansible power element,
    and an actuating lever operatively connected to be moved by expansion of said power element to engage the control lever and actuate the pilot valve from the "ignition" position to the "on" position.

14. A combination control as defined in claim 10 in which the operating means for the control valve means includes:
    a magnet operatively connected to be energized and deenergized in response to temperature changes at the region heated by the burner,
    means biasing the control valve means to its closed position,
    and an armature lever having a free end biased into engagement with the control valve means and magnetically responsive to energization of the magnet to actuate the control valve means to its open position.

15. A combination control for a fuel burning system having a main burner and a pilot burner comprising:
    an inlet and an outlet with a main passage therebetween for fluid flow,
    a pilot passage connected with the inlet and having an outlet for connection with the pilot burner,
    a pressure responsive modulating valve controlling the main passage,
    a bleed passage communicating at one end with the inlet and at the other end with the main passage,
    thermally actuated control valve means movable to open and close the bleed passage,
    a pressure regulating chamber in the bleed line,
    a pair of axially spaced flexible diaphragms having different effective areas forming a pressure responsive movable wall for the pressure regulating chamber,
    a pressure regulating valve movable to control the rate of flow through the pressure regulating chamber in response to movement of the movable wall, a port connecting the pressure regulating chamber with the space between the diaphragms, a change-over valve controlling the port to selectively increase or decrease the effective area of the movable wall, a bleed valve movable to open and close the bleed passage between the control valve means and the pressure regulating chamber, a pilot valve movable to open and close the pilot passage, thermally responsive pilot actuating mechanism connected to operate the pilot valve between open and closed positions in thermal response to the pilot burner, reset mechanism movable to actuate the pilot valve to a partially open ignition position, an override plunger carried by the pilot valve biased into engagement with the bleed valve to close the bleed valve when the pilot valve is in the closed and partially open ignition positions and permitting the bleed valve to open when the pilot valve is in the open position only, and a conduit communicating at one end with the side of the modulating valve opposite the inlet and at the other end with the bleed line between the inlet and the control valve means.

16. A combination control for a system having main and pilot burners comprising:

an inlet and an outlet with a main passage therebetween for fluid flow, a pilot passage connected with the inlet and having an outlet for connection with the pilot burner, a pressure responsive modulating valve controlling the main passage, a bleed passage communicating at one end with the inlet and at the other end with the main passage between the modulating valve and the outlet, a control valve movable to open and close the bleed passage, a pressure regulating chamber in the bleed line, a pair of axially spaced flexible diaphragms having different effective areas forming a pressure responsive movable wall for the pressure regulating chamber, a pressure regulating valve movable to control the rate of flow through the pressure regulating chamber in response to movement of the movable wall, a port connecting the pressure regulating chamber with the space between the diaphragms, a change-over valve controlling the port to selectively increase or decrease the effective area of the movable wall, means biasing the movable wall of the pressure regulating chamber in a direction to open the pressure regulating valve, a thermostatic element expansible and contractable in response to increases and decreases in the temperature acting on the thermostatic element, means operatively connecting the thermostatic element with the movable wall of the pressure regulating chamber and the control valve operable to adjust the biasing force on the movable wall and actuate the control valve in response to expansion and contraction of the thermostatic element, a bleed valve movable to open and close the bleed passage, a pilot valve movable to open and close the pilot passage, thermally responsive pilot valve actuating mechanism connected to operate the pilot valve between open and closed positions, reset mechanism movable to actuate the pilot valve to a partially open ignition position permitting flow through the pilot passage, a plunger carried by the pilot valve biased into engagement with the bleed valve to close the bleed valve when the pilot valve is in the closed and partially open ignition positions and permitting the bleed valve to open when the pilot valve is in the open position, and a conduit communicating at one end with the side of the modulating valve opposite the inlet and at the other end with the bleed line between the inlet and the control valve means.

17. In a heating system having a main fuel burner and a pilot burner, a combination control for regulating the fuel flow to the main burner comprising:

an inlet connected with a fuel source and an outlet connected with a main burner, a main fuel passage between the inlet and the outlet, a pressure responsive modulating valve controlling the main fuel passage, a bleed passage communicating at one end with the inlet and at the other end with the outlet, control valve means movable to open and close the bleed passage, thermostatic means for actuating the control valve means in response to temperature variations, a sensing conduit communicating at one end with the bleed passage between the inlet and the control valve means and at the other end with the opposite side of the modulating valve from the inlet, a pilot burner disposed adjacent the main burner, a pilot passage connecting the pilot burner with the inlet, a pilot valve movable to open and close the pilot passage, a pilot valve actuating mechanism for operating the pilot valve in thermo-response to ignition and extinction of the pilot burner, an intermittent pilot burner positioned adjacent the pilot burner, a passage connecting the intermittent pilot burner with the pilot passage between the pilot valve and pilot burner, thermostatic valve means controlling the passage to the intermittent pilot burner in response to temperature variations at the region heated by the main burner, a sensing bulb for the thermostatic means positioned adjacent the intermittent pilot burner to be heated by its flame and operate the control valve means in response to ignition and extinction of the intermittent pilot burner.

18. The combination defined in claim 17 further including:

a bleed valve movable to open and close the bleed line, and a resilient means connected between the pilot valve and the bleed valve operable to close the bleed valve when the pilot valve is closed, and operable to open the bleed valve when the pilot valve is opened.

19. The combination defined in claim 18 further including:

reset mechanism operable to actuate the pilot valve to a partially open ignition position, said resilient means operating to close the bleed valve when the pilot valve is in said ignition position.

20. In a heating system having a main fuel burner and a pilot burner, a combination control for regulating the fuel flow to the main burner comprising:

an inlet connected with a fuel source and an outlet connected with a main burner, a main fuel passage between the inlet and the outlet, a pressure responsive modulating valve controlling the main fuel passage, a bleed passage communicating at one end with the inlet and at the other end with the outlet, control valve means movable to open and close the bleed passage, thermostatic means for actuating the control valve means in response to temperature variations, a sensing conduit communicating at one end with the bleed passage between the inlet and the control valve means and at the other end with the opposite side of the modulating valve from the inlet, a pilot burner disposed adjacent the main burner, a pilot passage connecting the pilot burner with the inlet, a pilot valve movable to open and close the pilot passage, a pilot valve actuating mechanism for operating the pilot valve in thermal response to ignition and extinction of the pilot burner, a bleed valve movable to open and close the bleed passage and resilient means connected between the pilot valve and bleed valve operable to close the bleed valve when the pilot valve is in its ignition and closed positions and operable to open the bleed valve when the pilot valve is in its open position.

21. In a heating system having a main fuel burner and a pilot burner, a combination control for regulating the fuel flow to the main burner comprising:

an inlet connected with a fuel source and an outlet connected with the main burner, a main fuel passage between the inlet and outlet, a pressure responsive modulating valve controlling the main fuel passage, a bleed passage communicating at one end with the inlet and at the other end with the outlet, control valve means movable to open and close the bleed passage, thermostatic means for actuating the control valve means in response to temperature variations, a sensing conduit communicating at one end with the bleed passage between the inlet and the control valve means and at the other end with the opposite side of the modulating valve from the outlet, pressure regulating means in the bleed passage between the control valve means and the outlet, lever means interconnecting the pressure regulating means and the thermostatic means operable to adjust the pressure regulator in accordance with temperature variations, a pair of axially spaced diaphragms having different effective areas forming a pressure responsive movable wall for the pressure regulating means, a port connecting the bleed passage with the space between the diaphragms and a change over valve operable to open and close port to selectively change the effective area of a movable wall.

22. A combination control comprising:

an inlet for connection with a fuel source, an outlet for connection with a fuel burner, a main passage and a bleed line between said inlet and said outlet, a pressure regulator in said bleed line including an expansible chamber having a movable wall exposed to the atmosphere on the outside of said chamber and the bleed line pressure inside said chamber, a valve member attached to said wall operable to decrease the flow of fuel through said bleed line responsive to the expansion of said chamber by the bleed pressure, means urging said wall to contact said chamber, a control valve in said bleed line between said inlet and said pressure regulator operatively responsive to temperature variations at the region to be heated by the burner to open and close said bleed line, and a pressure sensitive modulating valve operatively connected to sense pressure variations in the bleed line to control the rate of flow from the inlet to the outlet by said main passage in accordance with the rate of flow through said bleed line.

References Cited by the Examiner

UNITED STATES PATENTS

| | | | |
|---|---|---|---|
| 510,017 | 12/1893 | Gassett | 236—80 |
| 2,292,830 | 8/1942 | Gauger et al. | 236—80 X |
| 2,513,705 | 7/1950 | Arden | 158—131 |
| 2,783,946 | 3/1957 | Lausky et al. | 236—48 |
| 2,784,913 | 3/1957 | Wasson | 236—92 |
| 2,876,951 | 3/1959 | Matthews | 236—84 |
| 2,911,152 | 11/1959 | Weber et al. | 236—1 |
| 3,036,778 | 5/1962 | Dillman | 236—80 |
| 3,092,323 | 6/1963 | Wantz | 236—68 |

WILLIAM F. O'DEA, *Acting Primary Examiner.*

ALDEN D. STEWART, *Examiner.*

Dedication 3,235,180.—*Marvin M. Graham*, San Pedro, *John W. Wright*, Long Beach, and *Henry C. Braucksiek*, Buena Park, Calif. COMBINATION PRESSURE AND TEMPERATURE CONTROL. Patent dated Feb. 15, 1966. Dedication filed Mar. 19, 1976, by the assignee, *Robertshaw Controls Company*.

Hereby dedicates to the Public the remaining term of said patent.

[*Official Gazette May 25, 1976.*]